US008879844B2

(12) United States Patent
Ludwig

(10) Patent No.: US 8,879,844 B2
(45) Date of Patent: *Nov. 4, 2014

(54) HIGH-PERFORMANCE CLOSED-FORM SINGLE-SCAN CALCULATION OF OBLONG-SHAPE ROTATION ANGLES FROM OPTICAL IMAGE DATA OF ARBITRARY SIZE AND LOCATION FOR USER INTERFACE APPLICATIONS

(71) Applicant: Lester F. Ludwig, San Antonio, TX (US)

(72) Inventor: Lester F. Ludwig, San Antonio, TX (US)

(73) Assignee: Lester F. Ludwig, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,111

(22) Filed: Dec. 9, 2013

(65) Prior Publication Data
US 2014/0098068 A1 Apr. 10, 2014

Related U.S. Application Data

(63) Continuation of application No. 13/846,830, filed on Mar. 18, 2013, which is a continuation of application No. 13/441,842, filed on Apr. 7, 2012, now Pat. No. 8,509,542, which is a continuation of application No. 12/724,413, filed on Mar. 15, 2010, now Pat. No. 8,170,346.

(60) Provisional application No. 61/210,250, filed on Mar. 14, 2009.

(51) Int. Cl.
*G06K 9/34* (2006.01)
*G06T 7/00* (2006.01)
*G06K 9/00* (2006.01)
*G06F 3/0488* (2013.01)
*G09G 5/34* (2006.01)
*G06K 9/46* (2006.01)
*G06K 9/52* (2006.01)
*G06F 3/042* (2006.01)

(52) U.S. Cl.
CPC .............. *G06F 3/042* (2013.01); *G06T 7/004* (2013.01); *G06K 9/00375* (2013.01); *G06F 3/0488* (2013.01); *G09G 5/34* (2013.01); *G06K 9/4647* (2013.01); *G06K 9/525* (2013.01); *G06K 9/00006* (2013.01)
USPC ........... 382/175; 382/162; 382/167; 382/165; 382/169; 382/170; 382/220; 382/218

(58) Field of Classification Search
CPC .......... G06K 9/00375; G06K 9/00006; G06K 9/4647; G06F 3/042; G06T 7/004
USPC ......... 382/175, 162, 167, 165, 169, 170, 220, 382/218
See application file for complete search history.

(56) References Cited

U.S. PATENT DOCUMENTS 5,592,752 A * 1/1997 Fu et al. ......................... 34/388
2008/0300055 A1* 12/2008 Lutnick et al. .................. 463/39

*Primary Examiner* — Mike Rahmjoo
(74) *Attorney, Agent, or Firm* — Procopio, Cory, Hargreaves & Savitch LLP

(57) ABSTRACT

A method and system for calculating oblong-shape rotation angles from optical image data of arbitrary size for user interface applications is described without the need of eigenvector routines and storage of the image data. The oblong shape may be of arbitrary size and location and need not be precisely elliptical. A few running sums are calculated and stored throughout each scan, and the results are obtained in closed form by simple post-scan computation. An algorithmic embodiment can execute on one or more hardware processors with limited or otherwise constrained computation power, available instruction cycles, available memory, etc. Hardware processors may CPUs found in desktops, laptops, tablets, or handheld computing devices. The resulting arrangement may be used for touch or optical user interfaces and other purposes.

20 Claims, 7 Drawing Sheets

HIGH-PERFORMANCE CLOSED-FORM SINGLE-SCAN CALCULATION OF OBLONG-SHAPE ROTATION ANGLES FROM OPTICAL IMAGE DATA OF ARBITRARY SIZE AND LOCATION FOR USER INTERFACE APPLICATIONS

CROSS-REFERENCE TO RELATED APPLICATIONS

This application is a continuation of U.S. application Ser. No. 13/846,830, filed Mar. 18, 2013, which is a continuation of U.S. application Ser. No. 13/441,842, filed Apr. 7, 2012, now U.S. Pat. No. 8,509,542, issued Aug. 13, 2013, which is a continuation of U.S. application Ser. No. 12/724,413, filed on Mar. 15, 2010, now U.S. Pat. No. 8,170,346, issued May 1, 2012, which claims benefit of priority from U.S. Provisional Application No. 61/210,250, filed Mar. 14, 2009, the contents of which are incorporated herein.

FIELD OF THE INVENTION

This invention relates to a method for determining the yaw angle of an oblong shape binary image, and in particular a method for determining the yaw angle using only a single pass of the binary data contained in the image.

DESCRIPTION OF THE RELATED ART

A binary image provided by a proximity sensing system, pressure sensing system, optical sensing system, image processing system, simulation program, etc. may comprise one or more contiguous shapes, these shapes comprising pixels assigned one binary value that are surrounded by a region comprising pixels assigned the opposite binary value.

In some situations, one or more of these contiguous shapes may be oblong in geometric form. This oblong shape may further be oriented in an angular position with respect to coordinate axes of the binary image (for example rows and columns) as suggested in FIGS. 1a-1c. An example of such a shape is that of a finger in contact with a proximity, pressure, optical, or other form of user interface touchpad, touch screen, or touch surface. An exemplary arrangement is suggested in FIG. 2. Here the orientation angle, taken with respect to the rows and columns of the image data produced by the touchpad sensor system, corresponds to the rotational yaw angle of the finger with respect to the vertical, horizontal, or other axes-system associated with or imposed on the touchpad sensor system. Such an arrangement is taught, for example, in U.S. Pat. No. 6,570,078.

In an exemplary arrangement pertaining to these and other types of proximity, pressure, optical imaging systems, a sensor array is interfaced to a data acquisition element. In some embodiments pertaining to these and other types of proximity, pressure, optical imaging systems, the data acquisition element may direct addressing, synchronization, stimulus, and/or other types of control signals to the sensor. In other embodiments, the sensor array may provide a stream of data, a data frame similar to an image, or other forms of proximity, pressure, and/or optical image measurement data to the data acquisition element. The data acquisition element provides measurement data to an algorithm executing on a hardware computer processor element. In an exemplary arrangement pertaining to these and other types of proximity, pressure, optical imaging systems, the data acquisition element may comprise an additional algorithm running on the same hardware computer processor element, or another hardware computer processor element. The hardware computer processor element(s) may comprise a CPU as found in a desktop, laptop, tablet, or handheld computing device, and embedded processor, a signal processor chip, etc. FIG. 3 provides an exemplary high-level representation of these concepts. In an embodiment, the production of binary image may include operations such as filtering or statistics-based processing to suppress noise in the measurements, non-operating sensor elements, missing data elements, etc.

The angular orientation, or rotation, with respect to a fixed reference orientation may be calculated in a number of ways. For example, a least squares method may be used to fit a line through the image data, and the slope of the fitted line may be converted to an angle by an inverse tangent or inverse cotangent function. Such an arrangement is taught, for example, in U.S. Pat. No. 6,570,078. Such a system can be advantageous because the least-squares calculation can be organized into a small collection of running sums that can be updated during scanning of the sensor. At the end of a scan, this small collection of running sums is presented to a simple post-scan calculation to determine the best-fit line slope, which as described above is presented to an inverse tangent or inverse cotangent function to recover the angular orientation or rotation. It is noted that the least-squares line fit relies on summing the square distance of deviation from an unknown parameterized line, and the line parameters are then algebraically calculated so as to minimize the sum of the square distance deviations. FIG. 4 depicts an exemplary high-level representation of this type of arrangement.

Another way to calculate angular orientation or rotation with respect to a fixed reference orientation is though use of an eigenvector approach applied to a 2×2 covariance matrix, planar moment of inertia (matrix) tensor, or other 2×2 quadratic-form matrix. The covariance matrix, planar moment of inertia (matrix) tensor, and their associated (quadratic form) variants rely on summing the square distance of deviation from a associated centroid (row center and column center).

The eigenvectors of the covariance matrix, planar moment of inertia (matrix) tensor, and other quadratic-form matrices of the like can be interpreted as rotation angles and related to columns of a 2×2 rotation matrix. Such an approach may be found in the pending U.S. patent application Ser. No. 12/541,948 and elsewhere, for example in U.S. Pat. No. 4,748,676. The angle of a selected eigenvector can be calculated by taking the ratio of the two components of the eigenvector and presenting this ratio to an inverse tangent or inverse cotangent.

There are at least two areas of practical difficulties with the latter approach that are addressed by the present invention. First, finding eigenvectors typically involves a complicated algorithm. The present invention overcomes this by providing a closed-form solution for the components of a selected eigenvector sufficient to determine the angle of rotation. Second, if the calculations are made directly from the definitions, two passes through the data are required: a first pass must be made through the full set of image data in order to first determine the centroid (row center and column center), then a second pass must be made through the full set of image data in order to calculate the square of the distance of separation of a given pixel from the centroid. FIG. 5 shows an exemplary arrangement calling out these practical concerns.

The above attributes of the latter approach has several disadvantages. For example in large images, the data must be stored or a long new scan must be started. Regardless of the image size, should the image data not be stored, a rapid change in the image data from scan to scan can corrupt a calculation that uses the centroid calculated from a previous scan to find the squared separation distance from the centroid calculated in a current scan. The present invention overcomes these and other related problems by decomposing the squared separation distance calculations in such a way that the centroid is not needed until a post-scan calculation, and the decomposition involves running sums that may be calculated during the same scan used to create the running sums for the row and column centers. In many applications, for example those required to be responsive in user-perceived real-time (such as in user interface applications, real-time image recognition, or real-time machine vision) and/or executing on one or more hardware processors with limited or otherwise constrained computation power, available instruction cycles, available memory, etc., these disadvantages can be significant and preclude practical use of the latter approach. Thus, a more efficient and realistic implementation of yaw angle calculation is desirable.

BRIEF DESCRIPTION OF THE DRAWINGS

The above and other aspects, features and advantages of the present invention will become more apparent upon consideration of the following description of preferred embodiments taken in conjunction with the accompanying drawing figures, wherein.

DETAILED DESCRIPTION

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Figure 1A:
FIGS. 1a-1c depict exemplary oblong contiguous shapes comprised within a binary image, wherein the shapes may be oriented in an angular position with respect to coordinate axes of the binary image.
Figure 1B:
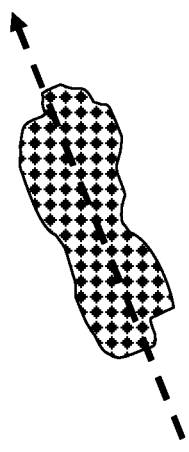
Figure 1C:
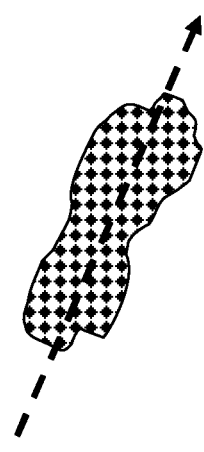
Figure 2:
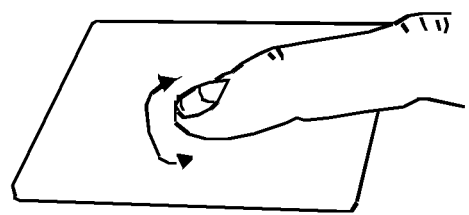
FIG. 2 depicts an exemplary arrangement wherein a finger in contact with a proximity, pressure, optical, or other form of user interface touchpad, touch screen, or touch surface'
Figure 3:
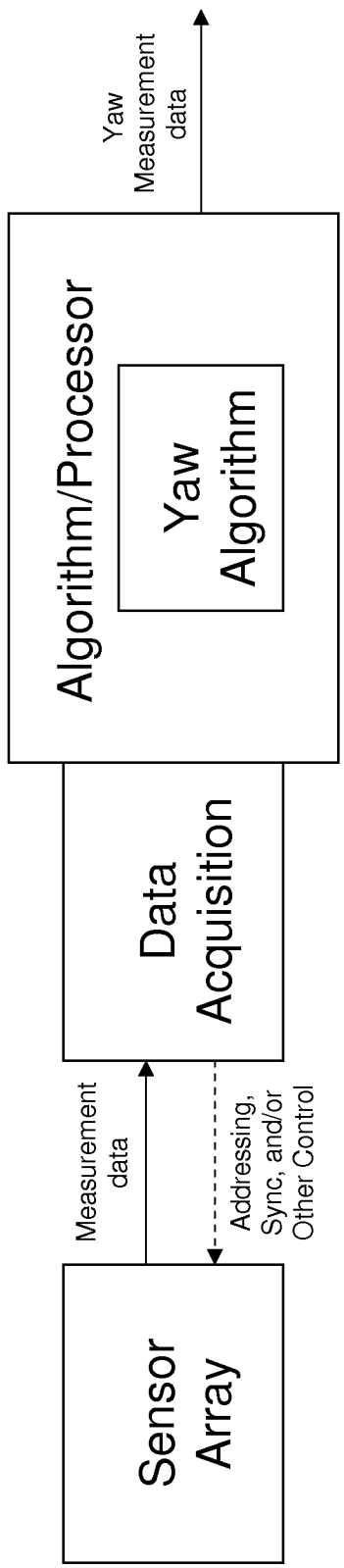
FIG. 3 provides an exemplary high-level representation of exemplary systems relevant to the present invention.
Figure 4:
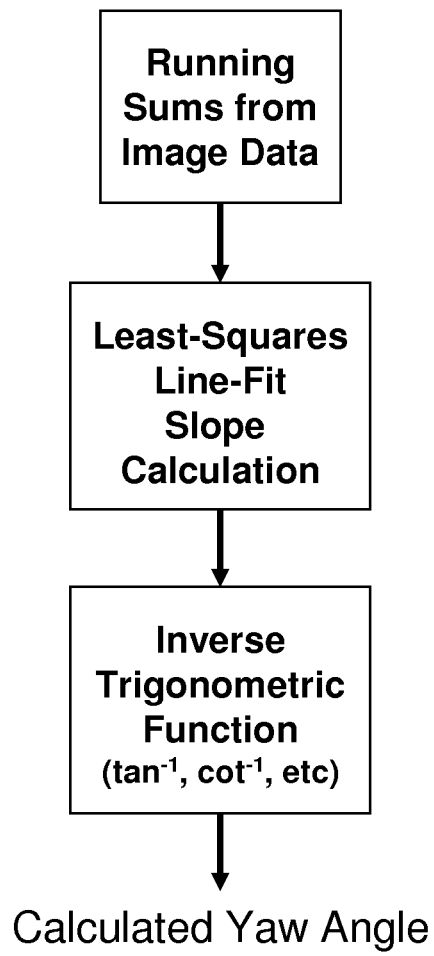
FIG. 4 depicts an exemplary high-level representation of an exemplary approach for computing an implied yaw angle employing a least-squares line fit and an inverse trigonometric function.
Figure 5:
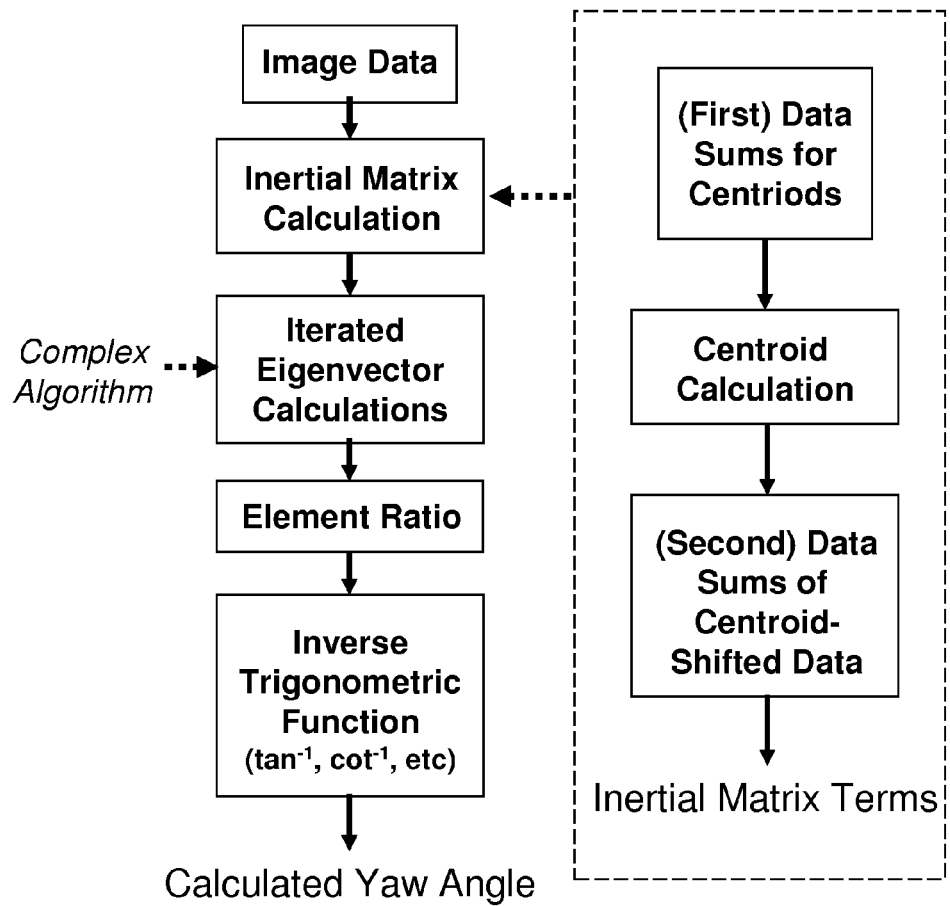
FIG. 5 depicts an exemplary high-level representation of an exemplary approach for computing an implied yaw angle employing an eigenvector of an inertial matrix and an inverse trigonometric function, further calling out problematic implementation concerns and limitations.
Figure 6:
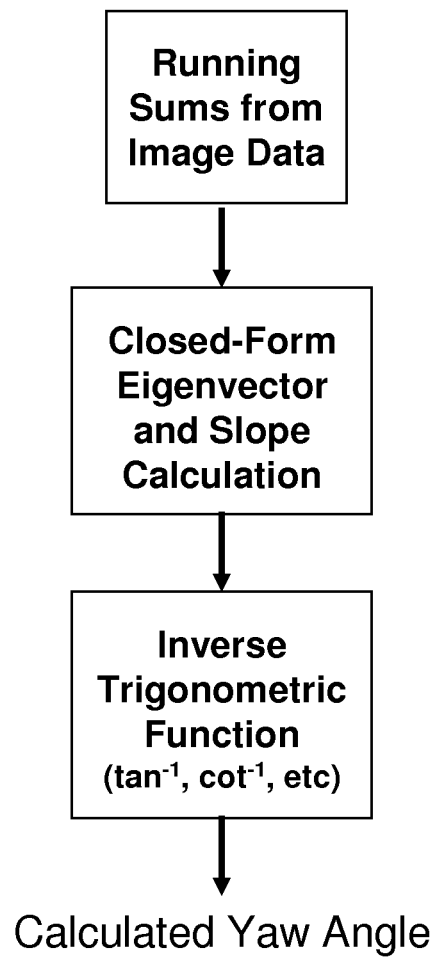
FIG. 6 depicts an exemplary representation of the invention comparable to the exemplary arrangement of FIG. 4.

Thus the present invention provides a scalable high-performance closed-form single-scan calculation of oblong-shape rotation angles from binary images of arbitrary size using running sums. No eigenvector routines are used, and no storage of the image data is required. Only a few running sums are calculated and stored throughout each scan, and the results are obtained in closed form by simple post-scan computation. The resulting arrangement may be implemented in a form such as that depicted in FIG. 6, directly comparable to the exemplary arrangement of FIG. 4 and its aforementioned advantages. This approach additionally can be used or adapted to provide other derived parametric data as well, for example measures of the oblongness of the oblong-shape via closed-form calculations of the eigenvalues. The resulting system and/or method may be used for touch or optical user interfaces, real-time image recognition, real-time machine vision, and other purposes.

In six-degree-of-freedom rigid motion, the three different degrees of angles for roll, pitch, and yaw are commonly denoted by the symbols $\phi$, $\theta$, and $\psi$. As an envisioned application is recovery of the yaw angle of a finger contact image with a touchpad system, the rotation angle to be calculated by the invention will be denoted $\psi$.

In the field of analytical mechanics the moment of inertia tensor or matrix is at times regarded as defining the orientation of a solid object in free-space or the plane. The following 2×2 covariance, planar moment of inertia, or other quadratic-form matrix is assumed for the algorithm for calculating the moment of inertia to calculate the rotation angle $\psi$.

$$\begin{bmatrix} RR & RC \\ CR & CC \end{bmatrix} \quad (1)$$

Here "R" denotes "row" and "C" denotes "column," said rows and columns as may be used to organize the scan of an array sensor or an image data set provided by other means or systems. There are several definitions for these terms that involve inclusions or neglect of normalizations and the use minus signs on the off-diagonal terms. These varying definitions end of not affecting the calculations presented herein appreciably, so the simplest definition (no normalization, no off-diagonal negative signs) is provided and commentary offered later as to implications of the various definitions. As will be seen, this simplest definition also offers performance advantages in computation, particularly in real-time systems.

The entries of the matrix as defined above (RR, RC, CR, and CC) are cumulative sums obtained by the following:

$$RR = \Sigma\Sigma(ri-r_0)^2 * th(ri,ci) \quad (2)$$

$$RC = \Sigma\Sigma(ri-r_0)(ci-c_0) * th(ri,ci) \quad (3)$$

$$CR = \Sigma\Sigma(ci-c_0)(ri-r_0) * th(ri,ci) \quad (4)$$

$$CC = \Sigma\Sigma(ci-c_0)^2 * th(ri,ci) \quad (5)$$

The double sums may be calculated over all row and column index combinations in any order. The variable $r_0$ denotes the mean row-coordinate of the non-zero pixels (i.e., the geometric row center), and the variable $c_0$ denotes the mean column-coordinate of the non-zero pixels (i.e., the geometric column center). The function $th(ri,ci)$ is a binary-valued $\{0,1\}$ function that represents whether a measurement or data value, $p(ri,ci)$ is greater than a specified threshold t. The value of t can be adjusted to suppress the computational impacts of low-level noise in the sensor measurements or other data.

$$th(ri,ci) = if(p(ri,ci) \geq t) \quad (6)$$

For example, an exemplary embodiment would thus during a scan assign measurement or data values exceeding t with the value of 1, and otherwise assign a value of 0. Pixel measurements or data whose value of $th(ri,ci)$ is 1 will be referred to as "active pixels" while other pixels will be referred to as "non-active pixels." Multiplying by $th(ri,ci)$ thus excludes terms associated with non-active pixels in the computation of obtaining aggregated sums because for these the value of th(ri,ci) is zero.

The quantity RR contains the value of the sum of the square of the vertical distance from the geometric center, and the quantity CC contains the value of the sum of the square of the horizontal distance from the geometric column center.

The quantities RC and CR are equivalent and thus interchangeable in subsequent calculation. Each is a cumulative sum of the product of the vertical and horizontal distance from the geometric center.

Note the definition of each of RR, RC, CR, and CC depend on the value of $r_0$ and $c_0$. Thus a direct calculation using the literal definition of RR, RC, CR, and CC would appear to require the values of $r_0$ and $c_0$ to be first calculated in advance. As mentioned earlier, this could require an entire second pass through the image data, but as shown later these may be calculated in the same scan of the data as that for of $r_0$ and $c_0$ by an innovation of the present invention Obtaining Geometric Row and Column Center In many embodiments, measurements from each sensor within an array of sensors (or other data) are acquired and values are examined in a specified order. For example, each sensor pixel measurement (or other data) may be selected according to nested increasing row and column indices. In other embodiments, such as those described in U.S. application Ser. No. 12/418,605, a distributed scan may be used and corresponding separate running sums may be combined in a post-scan calculation.

For simplicity, it can be assumed there is a sequential scan of the entire array of sensor array measurements or other image data, and that there is only a single contiguous shape (or region) of active pixels. More complex situations, such as those where there are multiple contiguous regions of active pixels present, can be readily handled by identifying each contiguous region of active pixels and computing a separate isolated set of running sums (to be described) for each such region. Such approaches are discussed in U.S. application Ser. No. 12/418,605.

An exemplary embodiment is now presented for the aforementioned assumed situation of only a single contiguous region of active pixels. As each active pixel is encountered, a counter variable tval gets incremented by 1. The value of tval will represent the (pixel-count metric of) "area" of the contiguous region of active pixels. At the completion of a scan, the value of the geometric row center may be readily obtained by dividing cumulative sum of row indices of active pixels by the number of active pixels. Similarly, the value of the geometric column center can then be readily obtained by dividing cumulative sum of column indices of active pixels by the number of active pixels.

For example, let the cumulative sum of row and column indices be represented by the following variables:

rsum=the cumulative sum of the row indices of active pixels csum=the cumulative sum of the column indices of active pixels An exemplary implementation may be structured as:

```
for(ri=1; ri<=rows; ri++) {          // scan each row
    for(ci=1; ci<=cols; ci++) {      // scan each column
        if(p(ri,ci)>=t) {            // if the value of pixel exceeds the
                                     //    threshold
            tval++;                  // increment tval by 1
            rsum += ri;              // increment rsum by ri
            csum+=ci;                // increment csum by ci
```

```
        };
    };
};
```

Note that in this exemplary programming language implementation, statements for cumulative rsum and csum executed when the if statement is satisfied, ri and ci do not need to be multiplied by the value of th(ri,ci) because when the if statement is satisfied, the value of th(ri,ci) is effectively 1 and when the if statement is not satisfied the sum statements are skipped over (thus equivalent to a value of 0 for th(ri,ci)).

At the end of the data array scan the geometric centers of row and column, $r_0$ and $c_0$, may be readily calculated in a post-scan calculation using the values of cumulative sum variables above:

$$r_0 = \frac{rsum}{tval} \qquad (7)$$

$$c_0 = \frac{csum}{tval} \qquad (8)$$

The values of these variables may be stored for subsequent calculations and/or system output. For example, the values of $r_0$ and $c_0$ may be output directly as the geometric center of a finger's contact with a touchpad sensor array. The values of tval, rsum and csum may also be stored for subsequent calculations.

In some embodiments one or more of the values of tval, rsum and csum may be used as system output.

Obtaining Entries of the Covariance Matrix

If the definition of RR, RC, and CC is used directly for the calculation, the values of the row geometric center $r_0$ and the column geometric center $c_0$ obtained above must be used for another scan or pass through the data array. This is because, in the definitions, these expressions depend on the values of geometric centers of rows and columns, $r_0$ and $c_0$.

Given the values of geometric centers of rows and columns $r_0$ and $c_0$, the values of RR, RC, and CC may be directly calculated from their previously provided definitions $$RR = \Sigma\Sigma(ri-r_0)^2 * th(ri,ci) \qquad (9)$$

$$RC = CR = \Sigma\Sigma(ri-r_0)(ci-c_0) * th(ri,ci) \qquad (10)$$

$$CC = \Sigma\Sigma(ci-c_0)^2 * th(ri,ci) \qquad (11)$$

as follows:

```
for(ri=1; ri<=rows; ri++) {            // scan each row
    for(ci=1; ci<=cols; ci++) {        // scan each column
        if(p(ri,ci)>t) {               // if the value of pixel exceeds the
                                       //    threshold
            tval++;                    // increment tval by 1
            RR+=((ri-r0)^2);           // increment RR by (ri-r0)^2
            RC+=(ri-r0)*(ci-c0);       // increment RC by (ri-r0)*(ci-c0)
            CR+=(ci-c0)*(ri-r0);       // increment CR by (ci-c0)*(ri-r0)
            CC+=((ci-c0)^2);           // increment CC by (ci-c0)^2
        };
    };
};
```

However, a procedure such as this must be done in a second pass through the image data because the values of geometric centers of rows and columns $r_0$ and $c_0$ must be known in advance. As mentioned earlier, the present invention provides for expanding the quadratic terms and reorganizing the sums above so that the row geometric center and column geometric center are not needed until a post-scan calculation, and the decomposition involves a small collection of running sums that may be computed along side those needed to calculate the row geometric center and column geometric center. This is described below.

Consolidation into a Single Scan of Binary Data Array

As mentioned above, the need for a second scan or pass through the data array can be eliminated by expanding the quadratic terms involved in the definitions of RR, RC, and CC. More specifically equations for RR, RC, CR, and CC from above $$RR = \Sigma\Sigma(ri-r_0)^2 * th(ri,ci) \qquad (12)$$

$$RC = CR = \Sigma\Sigma(ri-r_0)(ci-c_0) * th(ri,ci) \qquad (13)$$

$$CC = \Sigma\Sigma(ci-c_0)^2 * th(ri,ci) \qquad (14)$$

can be expanded as follows:

$$RR = (\Sigma\Sigma ri^2 * th(ri,ci)) - (2 * r_0 * \Sigma\Sigma ri * th(ri,ci)) + (r_0^2 * \Sigma th(ri,ci)) \qquad (15)$$

$$RC = CR = (\Sigma\Sigma ri * ci * th(ri,ci)) - (c_0 * \Sigma\Sigma ri * th(ri,ci)) - (r_0 * \Sigma\Sigma ci * th(ri,ci)) + (r_0 * c_0 * \Sigma th(ri,ci)) \qquad (16)$$

$$CC = (\Sigma ci^2 * th(ri,ci)) - (2 * c_0 * \Sigma ci * th(ri,ci)) + (c_0^2 * \Sigma th(ri,ci)) \qquad (17)$$

In the above equations, some of the terms that depend on the value of $r_0$ and $c_0$ can be replaced with other terms, and $r_0$ and $c_0$ are no longer needed. Specifically:

$\Sigma th(ri,ci)$ is equivalent to tval
$\Sigma(ri * th(ri,ci))$ is equivalent to $r_0 * tval$
$\Sigma(ci * th(ri,ci))$ is equivalent to $c_0 * tval$
$r_0$ is equivalent to $$\frac{rval}{tval}.$$

$c_0$ is equivalent to $$\frac{cval}{tval}.$$

In an exemplary programming language embodiment, three new running sum variables, rrval, ccval, and rcval, may be introduced.

rrval=cumulative sum of the square of row indices of active pixels;
ccval=cumulative sum of the square of column indices of active pixels;
rcval=cumulative sum of the product of row and column indices of active pixels.

These running sums can be included in the first scan loop where the cumulative sum of the row indices (earlier called rsum, but renamed rval as used and clearly seen in the exemplary algorithm below) and column indices (earlier csum, but renamed cval as used and clearly seen in the exemplary algorithm below) are calculated. The result requires six running variables used in the scan:

tval
rval
cval
rrval
ccval
rcval

The covariance matrix can then be calculated in a post-scan calculation. Note the variables, $r_0$ and $c_0$, are replaced with $$\frac{rval}{tval}$$

and $$\frac{cval}{tval}$$

in the expansions.

$$RR = \left(\sum\sum ri^2 * th(ri, ci)\right) - \left(2 * \frac{rval}{tval} \sum\sum ri * th(ri, ci)\right) + \left[\frac{rval}{tval}\right]^2 * tval \qquad (18)$$

$$RC = CR = \left(\sum\sum ri * ci * th(ri, ci)\right) - \left(\frac{cval}{tval} \sum\sum ri * th(ri, ci)\right) - \left(\frac{rval}{tval} \sum\sum ci * th(ri, ci)\right) + \left(\frac{rval}{tval} * \frac{cval}{tval}\right) * tval \qquad (19)$$

An exemplary programming language embodiment can then be implemented as follows, again as before replacing the th(ri,ci) function in the above equations with a common conditional-execution "if" statement. Additionally, a post-scan computation is appended after the scan.

```
for(ri=1; ri<=rows; ri++) {           // scan each row
    for(ci=1; ci<=cols; ci++) {       // scan each column
        if(p(ri,ci)>=t) {             // if the value of pixel exceeds
                                      //   the threshold
            tval++;                   // increment tval by 1
            rrval+=ri*ri;             // increment rrval by ri^2
            rval+=ri;                 // increment rval by ri
            ccval+=ci*ci;             // increment ccval by ci^2
            cval+=ci;                 // increment cval by ci
            rcval+=ri*ci;             // increment rcval by ri*ci
        };
    };                                // end the scanning loop
    RR=rrval - 2*(rval/tval)*rval+(rval/tval)^2*tval;
    RC=(rcvalal/tval)*rval+(rval/tval)*cval +(rval/tval)*
    (cval/tval)*tval;
    CC=ccva 1- 2*(cval/tval)*cval+(cval/tval)^2*tval;
```

Additionally, the above equations and programming language embodiments can be further simplified in a number of ways. For example:

$$\left[\frac{rval}{tval}\right]^2 * tval = \left[\frac{rval^2}{tval}\right] \qquad (21)$$

$$\left[\frac{cval}{tval}\right]^2 * tval = \left[\frac{cval^2}{tval}\right] \qquad (22)$$

$$\left(\frac{rval}{tval} * \frac{cval}{tval}\right) * tval = \left(\frac{rval * cval}{tval}\right) \qquad (23)$$

and $$\sum (ri * th(ri, ci)) = r_0 * tval = \frac{rval}{tval} * tval = rval \qquad (24)$$

$$\sum (ci * th(ri, ci)) = c_0 * tval = \frac{cval}{tval} * tval = cval \qquad (25)$$

Such corresponding simplifying substitutions may be advantageously made in programming language embodiments, reducing the computational complexity and potentially reducing the introduction of numerical error.

Applying these simplifications to the three statements of the exemplary post-scan computation $$RR = rrval - 2 * \frac{rval}{tval} * rval + \left(\frac{rval}{tval}\right)^2 * tval \qquad (26)$$

$$RC = rcval - \frac{cval}{tval} * rval + \frac{rval}{tval} * cval + \frac{rval}{tval} * \frac{cval}{tval} * tval \qquad (27)$$

$$CC = ccval - 2 * \frac{cval}{tval} * cval + \left(\frac{cval}{tval}\right)^2 * tval \qquad (28)$$

yields the simplification to the post-scan calculation:

$$RR = rrval - \frac{rval^2}{tval} \qquad (29)$$

$$RC = rcval - cval * \frac{rval}{tval} \qquad (30)$$

$$CC = ccval - \frac{cval^2}{tval} \qquad (31)$$

For the RR and CC terms, it may appear surprising that the cross-product term and a square-term would evaluate in such a way as to partially cancel out and subsequently results in the difference between two square terms. However, on occasion this phenomenon shows up in classical mathematic analysis, so it should not be disconcerting to one skilled in the art. Specifically it is an inventive step of the present invention to structure the mathematics in such a way as to make this cancellation possible and leverage it in an advantageous computation. As a bonus, the RC term also enjoys a similar simplification.

Closed-Form Expression for the Rotation Angle

Using the above, a covariance matrix, planar moment of inertia (matrix) tensor, or related 2×2 quadratic form matrix can be obtained in a simple single scan without requiring storage of the image but rather the storage of only six running sums.

As mentioned in the Introduction, the eigenvectors of the covariance matrix, planar moment of inertia (matrix) tensor, or other quadratic-form matrix of the like can be interpreted as depicting a set of rotated orthogonal coordinates. The angle between these rotated coordinates and the original reference coordinates can be associated with a rotation angle of the oblong active region's shape. In one interpretation, one of the eigenvectors may be used to define the angle. In another interpretation, the two-dimensional eigenvectors of the 2×2 covariance matrix may be related to columns of a 2×2 rotation matrix. In either case, the angle of a selected eigenvector can be calculated by taking the ratio of the two components of the eigenvector and presenting this ration to an inverse tangent or inverse cotangent. This calculated angle can be related to the rotation angle of the oblong active region's shape. Further, the way the angle is calculated (what ratio to take of elements of what eigenvector, whether inverse tangent or inverse cotangent is used, etc.) can directly incorporate the imposed interpretation of the rotation angle of the oblong active region's shape.

However, as mentioned in the introduction, in general finding eigenvectors involves a complicated algorithm. The present invention overcomes this by providing a closed-form solution for the components of a selected eigenvector sufficient to determine the angle of rotation. A closed form solution can be calculated because the 2×2 eigenvector and eigenvalue problem involves the roots of a simple quadratic equation. The well-known quadratic formula provides a closed-form expression for the roots of a simple quadratic equation as long as the coefficient of the cross-product term is non-zero. For cases where the coefficient of the cross-product term is non-zero, then, the eigenvectors and eigenvalues can be found in closed form. For cases where the coefficient of the cross-product term is zero, it can be readily seen that this corresponds to zero values of the off-diagonal elements of the quadratic-form (covariance, planar moment of inertia, etc.) matrix which have a straightforward geometric interpretation. In this way the rotation angle can be directly calculated from the entries of the quadratic form matrix without an eigensystem (eigenvector and eigenvalue) algorithm.

Specifically the matrix $$\begin{bmatrix} a & b \\ c & d \end{bmatrix} \qquad (32)$$

can be readily shown through simple use of the quadratic formula to have the eigenvalues of $$\frac{\left(a + d + \sqrt{a^2 + 4bc - 2ad + d^2}\right)}{2} \qquad (33)$$

$$\frac{\left(a + d - \sqrt{a^2 + 4bc - 2ad + d^2}\right)}{2} \qquad (34)$$

For cases where c is non-zero, these eigenvalues can be used to calculate a closed-form representation of the eigenvectors. The eigenvectors may be normalized in a variety of ways, for example as $$\left\{\frac{\left(a - d + \sqrt{a^2 + 4bc - 2ad + d^2}\right)}{2c}, 1\right\} \qquad (35)$$

$$\left\{\frac{\left(a - d - \sqrt{a^2 + 4bc - 2ad + d^2}\right)}{2c}, 1\right\} \qquad (36)$$

Or by multiplying the eigenvectors above through by a factor of 2c, as $$\{(a-d+\sqrt{a^2+4bc-2ad+d^2}), 2c\} \qquad (37)$$

$$\{(a-d-\sqrt{a^2+4bc-2ad+d^2}), 2c\} \qquad (38)$$

The former representation, to the extent it can be directly calculated (rather than from a conversion of the latter representation), is advantageous in that the first element of each eigenvector is the same as the ratio of the first and second elements of the eigenvector (since the denominator of the ratio is 1).

A covariance matrix form requires c=b, so the above more general eigenvectors simplify to $$\left\{\frac{\left(a - d + \sqrt{a^2 + 4b^2 - 2ad + d^2}\right)}{2b}, 1\right\} \qquad (39)$$

-continued $$\left\{\frac{(a-d-\sqrt{a^2+4b^2-2ad+d^2})}{2b}, 1\right\} \quad (40)$$

As to the inclusion or disregard for normalization in various definitions of the covariance or inertia matrix, clearly multiplying through all terms a, b, d with a normalization factor would simply cancel out in the above eigenvector expressions. It is noted that the eigenvalues would be scaled, but they are not used for the angle calculations to follow. By using a definition without normalization, many extra computation steps that do not add value can be avoided, improving real-time performance and reducing the amount of stored code.

Further, as to the inclusion of minus signs on the two off-diagonal elements of the covariance or inertia matrix called for in some definitions, review of the above calculations show this to reverse the sign of the angle that would be associated with the eigenvector. The sense of angle direction definition is an engineering design choice in the calculations and may be readily compensated for or handled in other ways to produce the desired computed outcome. By using a definition without off-diagonal minus signs, extra computation steps that do not add value can be avoided, further improving real-time performance and reducing the amount of stored code.

(By way of comparison, a rotation matrix form requires c=−b, so here the more general eigenvectors simplify to $$\left\{\frac{(d-a+\sqrt{a^2-4b^2-2ad+d^2})}{2b}, 1\right\} \quad (41)$$

$$\left\{\frac{(d-a-\sqrt{a^2-4b^2-2ad+d^2})}{2b}, 1\right\} \quad (42)$$

The values of RR, RC, and CC can be substituted for a, b, and d respectively to obtain a first eigenvector of the covariance matrix as $$\left\{\frac{RR-CC+\sqrt{RR^2+4*CC^2-2*RR*CC+CC^2}}{2RC}, 1\right\} \quad (43)$$

and a first eigenvector of the rotation matrix as $$\left\{\frac{CC-RR+\sqrt{RR^2-4*CC^2-2*RR*CC+CC^2}}{2RC}, 1\right\} \quad (44)$$

a slightly different result.)

The covariance (or, if applicable, rotation) matrix eigenvectors can be then operated upon by inverse tangent or inverse cotangent operations to obtain angles with various zero-angle orientations and positive-negative signs affiliated to clockwise and counter-clockwise angle directions. For example, to obtain a rotation angle ψ so that a zero-valued angle is associated with the oblong elongation oriented vertically and a positive angle value rotating clockwise, the following expression may be used where RC is non-zero:

$$\psi = \text{ArcCot}\left[\frac{RR-CC+\sqrt{RR^2+4*CC^2-2*RR*CC+CC^2}}{2RC}\right] \quad (45)$$

When RC is zero, the above expression become numerically undefined but may be interpreted analytically as having a (positive or negative) infinite value. The inverse cotangent function maps infinite value arguments to a zero angle, so a conditional "If-Then-Else" expression can be used to provide smooth handling of the rotation calculation between rotational angle values within the range of positive or negative 90 degrees:

$$\text{If}\left[b\;!=0,\right. \quad (46)$$

$$\psi = \text{ArcCot}\left[\frac{RR-CC+\sqrt{RR^2+4*CC^2-2*RR*CC+CC^2}}{2RC}\right],$$

$$\left.\psi = 0\right]$$

The conditional expression can be expanded further to handle cases where the rotation angle is effectively 90 degrees, for example:

$$\text{If}\left[\begin{array}{l}b\;!=0,\psi=\text{ArcCot}\left[\frac{RR-CC+\sqrt{RR^2+4*CC^2-2*RR*CC+CC^2}}{2RC}\right],\\ \text{If}\left[RR\geq CC, \psi=0, \psi=\frac{\pi}{2}\right]\end{array}\right] \quad (47)$$

where the value of $r_0$ is greater than $c_0$, the value of ψ will be set to π/1. This can be coded, for example, as follows.

```
if(RC!=0)                 // if RC is not equal to zero
    angle=ArcCot((RR−CC+sqrt(RR^v2+4*(RC^2)−2*RR*CC+(CC^2)/
    (2*RC));
else if (RR>=CC)          // if RC is equal to zeroand if RR>=CC
    angle=0;              // then the angle is zero
else
    angle=PI/2;           // otherwise the angle is PI/2
```

In general, to handle and distinguish the positive 90 degree rotation angle and negative 90 degree rotation angle additional information is needed. Such additional information may include, for example, information from pattern recognition functions, state information from angle-variation tracking, etc.

When used with low-power and/or otherwise busy processors (for example in small hand-held devices such as cellphones, PDAs, game controllers, remote controls, etc.), as well as with restricted word-size arithmetic (for example 8-bit), it can be advantageous to replace an actual inverse tangent or inverse cotangent function with a pre-computed table-look-up function as is understood by one skilled in the art.

As indicated above, this approach can be used to provide other derived parametric data such as measures of the oblongness of the oblong-shape via closed-form calculations of the eigenvalues. If the ratio of the eigenvalues is 1, the shape is a (non-oblong) circle. The farther the ratio of the eigenvalues is from the value of 1, the more oblong the shape.

As the eigenvectors for the covariance matrix (with c=b) are $$\frac{(a+d-\sqrt{a^2+4b^2-2ad+d^2})}{2} \quad (48)$$

$$\frac{(a+d-\sqrt{a^2+4c^2-2ad+d^2})}{2} \quad (49)$$

an exemplary closed-form expression for a (ratio of the eigenvalues) measure of oblongness of the shape is:

$$\text{oblongness} = \frac{a+d+\sqrt{a^2+4b^2-2ad+d^2}}{a+d-\sqrt{a^2+4b^2-2ad+d^2}} \quad (50)$$

The variables a, b, and d can be replaced with RR, RC, and CC as before to include as part of the post-scan algorithm described earlier.

Note that as this oblongness measure is a ratio of the eigenvalues, any scaling applied equally to both of the eigenvalues will cancel out. As a result, like the angle calculation, this oblongness measure is not affected by whether normalization is used or not in the definition of the covariance matrix.

Similarly, as the oblongness measure depends on the square of the B (b=RC) term, any off-diagonal minus signs which may or may not be used in the definition of the covariance matrix have no effect.

(By way of comparison, the eigenvectors for the rotation matrix (with c=−b) are $$\frac{a+d+\sqrt{a^2-4b^2-2ad+d^2}}{2} \quad (51)$$

$$\frac{a+d-\sqrt{a^2-4b^2-2ad+d^2}}{2} \quad (52)$$

another exemplary closed-form expression for a (ratio of the eigenvalues) measure of oblongness of the shape is:

$$\text{oblongness} = \frac{a+d+\sqrt{a^2-4b^2-2ad+d^2}}{a+d-\sqrt{a^2-4b^2-2ad+d^2}} \quad (53)$$

a slightly different result.)

Figure 7:
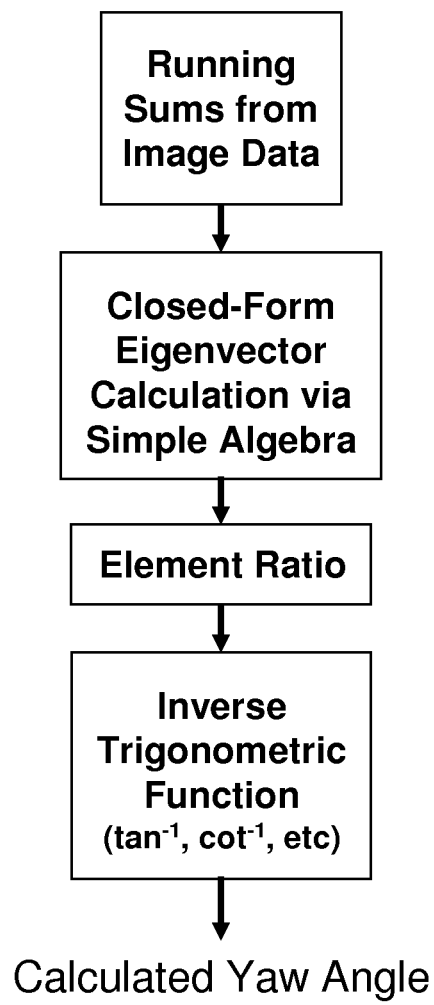
FIG. 7 depicts an exemplary representation of an embodiment of the invention.

A final result combining the various innovations of the invention results in a scalable high-performance closed-form single-scan calculation of oblong-shape rotation angles from binary images of arbitrary size using running sums. No eigenvector routines are used, and no storage of the image data is required. Only six running sums are calculated and stored throughout each scan, and the results are obtained in closed form by simple post-scan computation. This approach can be used to provide other derived parametric data as well, for example measures of the oblongness of the oblong-shape via closed-form calculations of the eigenvalues. An exemplary implementation is suggested in FIG. 7. An exemplary programming language embodiment is provided below:

```
for(ri=1; ri<=rows; ri++) {           // scan each row
   for(ci=1; ci<=cols; ci++) {        // scan each column
      if(p(ri,ci)>=t) {                // if the value of pixel exceeds the
                                        threshold
         tval++;                        // increment tval by 1
         rrval+=ri*ri;                  // increment rrval by ri^2
         rval+=ri;                      // increment rval by ri
         ccval+=ci*ci;                  // increment ccval by ci^2
         cval+=ci;                      // increment cval by ci
         rcval+=ri*ci;                  // increment rcval by ri*ci
      };
   };                                   // end the scanning loop
                                        // begin post-scan calculations
      Rcenter = rval/tval;              //row center result for output
      Ccenter = cval/tval;              //column center result for output
RR=rrval − (rval^2)/tval;
   RC=rcval − (cval*rval/tval);
   CC=ccval − (cval^2)/tval;
if(RC!=0)                               // if RC is not equal to zero
   angle=ArcCot((RR−CC+sqrt(RR^2+4*(RC^2)−2*RR*CC+(CC^2)/
   (2*RC));
else if (RR>=CC)                        // if RC is equal to zero and if
                                          RR>=CC
angle=0;                                // then the angle is zero
else
angle=PI/2;                             // otherwise the angle is PI/2
                                        // angle result for output
Oblongness = ( (RR+CC+sqrt(RR^2+4*(RC^2)−2*RR*CC+(CC^2) ) /
   ( (RR+CC−sqrt(RR^2+4*(RC^2)−2*RR*CC+(CC^2) );
                                        // oblongness result for output
```

The computational efficiency may be improved further by a single reusable computation of some expressions such as:

$sqrt(RR^2+4*(RC^2)-2*RR*CC+(CC^2))$ and, in some implementations, replacing the ArcCot function with simply-evaluated piecewise approximations and/or a table lookup of pre-computed values.

While the invention has been described in detail with reference to disclosed embodiments, various modifications—within the scope of the invention will be apparent to those of ordinary skill in this technological field. It is to be appreciated that features described with respect to one embodiment typically may be applied to other embodiments. Therefore, the invention properly is to be construed with reference to the claims.

The invention claimed is:

1. A computer-implemented method in an optical-image user interface employing a processor for computing an orientation angle of optical image data comprising an image comprising an oblong shape, the image of the oblong shape comprising thresholded pixels within image data, wherein each thresholded pixel is a scalar measurement comprising a numerical value exceeding a threshold, the method comprising:

determining a cumulative sum of the square of row indices of thresholded pixels, wherein an thresholded pixel is defined as a measurement data element within the binary-valued image data having a specified binary numerical value;

determining a cumulative sum of the square of column indices of thresholded pixels; determining a cumulative sum of the product of row and column indices of thresholded pixels;

determining a value according to a closed form algebraic formula comprising the cumulative sum of the square of row indices, the cumulative sum of the square of column indices, and the cumulative sum of the product of row and column indices;

determining the computed orientation angle of the oblong shape of binary-valued image data according to the value using an inverse angular function operation;

and providing the computed orientation angle as an output.

2. The method of claim 1 wherein the output is used to provide a user interface function.

3. The method of claim 2 wherein the computed orientation angle is used as a user interface quantity for controlling at least one aspect of a software application.

4. The method of claim 1 wherein the image data is produced from measurement data provided by an optical sensor array.

5. The method of claim 1 wherein the user interface function is used to control a cell-phone.

6. The method of claim 1 wherein the user interface function is used to control a game controller.

7. The method of claim 1 wherein the image data is produced at least in part by an optical imaging system.

8. The method of claim 1 wherein the image data is produced by an optical sensing system.

9. The method of claim 1 wherein the inverse angular function operation comprises an approximation of an inverse trigonometric function.

10. The method of claim 1 wherein the processor comprises an embedded controller.

11. A computer implemented user interface system for controlling computer applications by an angle measured from the content of an optical image, the user interface system comprising:

a memory that stores image data; and a processor in communication with the memory that:

receives the image data, the image data comprising an array of pixels having rows and columns wherein each row and column has a unique associated index value, and each pixel having has a unique row index value and column index value wherein each pixel further comprises a scalar measurement, the image data comprising a subset of pixels having values above a threshold value that are arranged in an oblong shape within the image data;

performs threshold operations on each pixel of the image data to produce binary image data to generate the oblong shape; computes the geometric center of the oblong shape, the geometric center comprising a row center value and a column center value;

defines a corresponding centered row index value by subtracting the row center value from the row index value for each row index value;

defines a corresponding centered column index value by subtracting the column center value from the column index value for each column index value;

computes a first cumulative sum of the square of centered row index values of the subset of pixels having values above the threshold value, second cumulative sum of the square of centered column index values of the subset of pixels having values above the threshold value, and a third cumulative sum of the product of centered row index values and centered column index values of the subset of pixels having values above the threshold value;

computes one or more numerical quantities within a closed form algebraic formula for a ratio of two terms of an inertial matrix defined by the binary-valued image data using each of first, second, and third cumulative sums; transforms the ratio into a calculated numerical angle value using an inverse trigonometric function operation; and provides the calculated numerical angle value as an output.

12. The system of claim 11 wherein the output is used to provide a user interface function.

13. The system of claim 12 wherein the calculated numerical angle value is used as a user interface quantity for controlling at least one aspect of a software application.

14. The system of claim 11 wherein the image data is produced from measurement data provided by an optical sensor array.

15. The system of claim 11 wherein the user interface function is used to control a cell phone.

16. The system of claim 11 wherein the user interface function is used to control a game controller.

17. The system of claim 11 wherein the image data is produced at least in part by an optical imaging system.

18. The system of claim 11 wherein the image data is produced by an optical sensing system.

19. The system of claim 11 wherein the inverse angular function operation comprises an approximation of an inverse trigonometric function.

20. The system of claim 11 wherein the processor comprises an embedded controller.

* * * * *